United States Patent [19]

Fuchs

[11] Patent Number: 4,479,876
[45] Date of Patent: Oct. 30, 1984

[54] PROCESS AND APPARATUS FOR THE BIOLOGICAL PURIFICATION OF WASTEWATER

[75] Inventor: Uwe Fuchs, Munich, Fed. Rep. of Germany

[73] Assignee: Linde Aktiengesellschaft, Wiesbaden, Fed. Rep. of Germany

[21] Appl. No.: 406,624

[22] Filed: Aug. 9, 1982

[30] Foreign Application Priority Data

Aug. 13, 1981 [DE] Fed. Rep. of Germany ....... 3131989

[51] Int. Cl.³ .............................................. C02F 3/30
[52] U.S. Cl. .................................. 210/605; 210/616; 210/630; 210/151; 210/903
[58] Field of Search ............... 210/605, 616, 615, 617, 210/618, 903, 150, 151, 626–628, 630, 604, 218

[56] References Cited

U.S. PATENT DOCUMENTS

| 2,071,591 | 2/1937 | Tholin | 210/616 |
| 3,764,523 | 10/1973 | Stankewich | 210/903 |
| 3,779,906 | 12/1973 | Levin | 210/616 |
| 3,957,632 | 5/1976 | Knopp et al. | 210/616 |
| 4,200,524 | 4/1980 | Levin | 210/616 |

FOREIGN PATENT DOCUMENTS

| 761830 | 7/1971 | Belgium | 210/150 |
| 14394 | 8/1980 | European Pat. Off. | 210/630 |
| 2002926 | 7/1971 | Fed. Rep. of Germany. | |
| 2249137 | 4/1974 | Fed. Rep. of Germany. | |
| 2640156 | 3/1978 | Fed. Rep. of Germany. | |
| 2839872 | 7/1980 | Fed. Rep. of Germany. | |
| 54-103255 | 8/1979 | Japan | 210/903 |

Primary Examiner—Benoit Castel
Attorney, Agent, or Firm—Millen & White

[57] ABSTRACT

This invention relates to a process for the biological purification of wastewater in at least two immediately successive treatment stages, followed by a post clarification stage wherein the process is adapted so that a wastewater-activated sludge mixture in one of the treatment zones exhibits only a minor biological load and a nitrification process is conducted therein. In accordance with the invention, an intermediate clarification tank is not required due to substantially all biological degradation having occurred in the stage immediately before the nitrification stage. To enhance nitrification a macroporous carrier material for supporting nitrifying bacteria, for example, activated carbon or polyurethane foam, is added into this nitrification treatment stage. The material can be readily retained in the nitrification zone by providing appropriate retaining means. This process offers the advantage that the concentration of nitrifying agents, i.e., bacteria necessary for nitrification is maintained at the required level at all times. In another aspect, the invention relates to the apparatus for carrying out the process.

11 Claims, 1 Drawing Figure

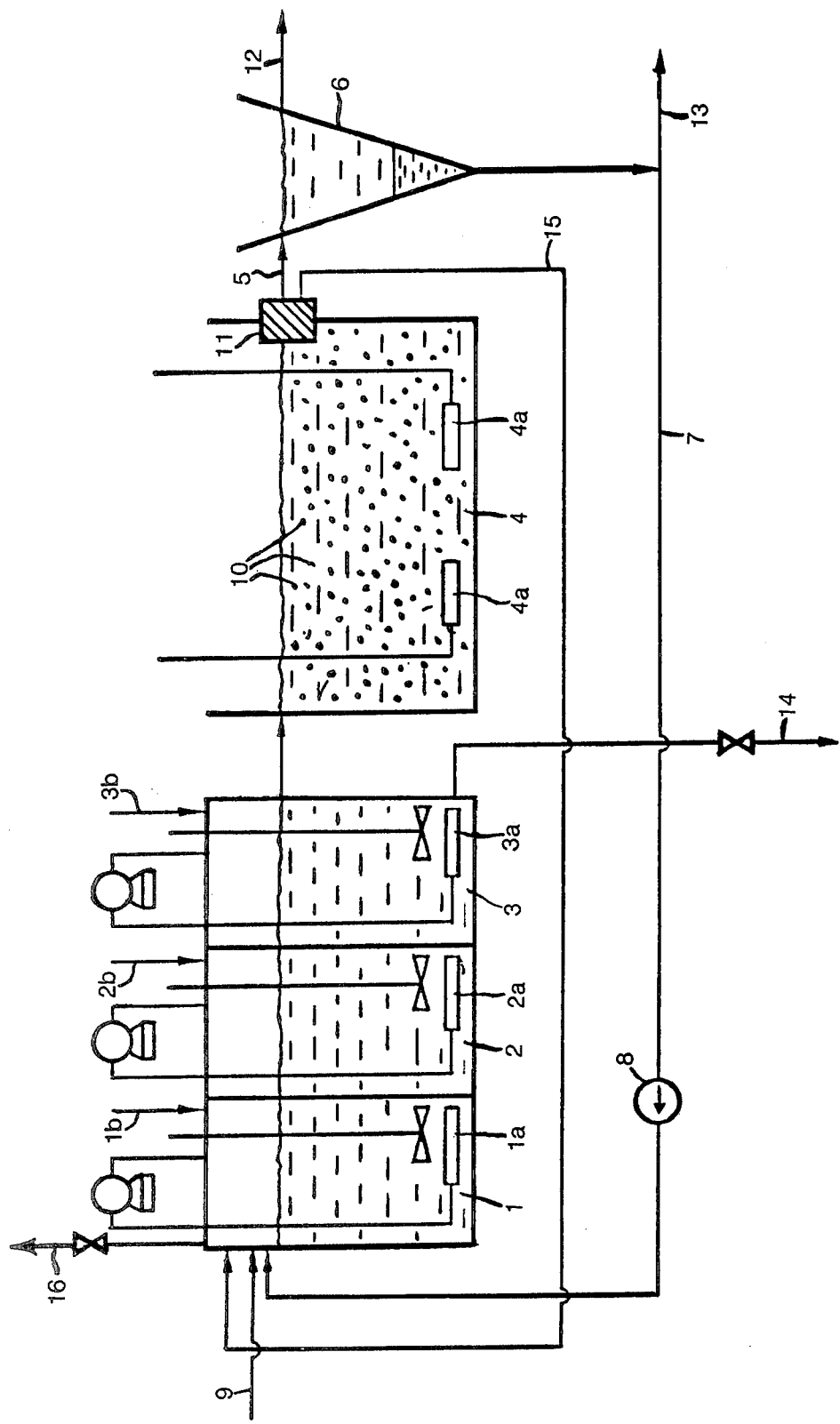

PROCESS AND APPARATUS FOR THE BIOLOGICAL PURIFICATION OF WASTEWATER

CROSS REFERENCE TO RELATED APPLICATION

This invention is related to copending application Ser. No. 298,430, filed Sept. 1, 1981, of the same inventor, now U.S. Pat. No. 4,415,454, and incorporated by reference herein.

BACKGROUND OF THE INVENTION

This invention relates to wastewater treatment, and in particular to biological oxidation treatment in at least two stages comprising: decomposing at least a portion of organic pollutants in the stages by at least partially gas-treating, e.g., aeration, in the presence of activated sludge, discharging the so-treated wastewater-activated sludge mixture from the treatment stages, and dividing in a post clarification stage into purified water and sludge. The sludge divided in the post clarification stage is at least partially recycled into the treatment stages. This invention also relates to an apparatus for conducting the process.

In such a process, wastewater is conventionally initially mixed, in the first stage, with activated sludge with the simultaneous introduction of molecular oxygen in the form of air or a gas having a higher oxygen concentration than air. By virtue of the activity of the aerobic microorganisms contained in the activated sludge, the organic pollutants of the wastewater are, decomposed or degraded, the specific mechanism being conversion, in part, into bacterial substance and, in part, into $CO_2$ and water, the overall effect in the first stage being extensive oxidation of the carbon compounds. The microorganisms in this stage require oxygen to maintain their metabolic function, as well as for growth and multiplication, for rapidly degrading the organic substances in the wastewater. The microorganisms are relatively compact, i.e., sufficiently low density and low surface to volume ratio, so that they can be removed as settled sludge in a post clarification tank. The purified wastewater and sludge are then discharged from the post clarification tank. A portion of the discharged sludge, containing settled microorganisms, is recycled into the first treatment stage to maintain a desired quantity of microorganisms in the wastewater-activated sludge mixture, whereby the biological process operates continuously.

In addition to the biological degradation of the organic substance, a chemical degradation is simultaneously conducted in a second stage comprising oxidizing ammonium nitrogen to nitrite and nitrate in the presence of primarily autotrophic bacteria. The bacteria in this second stage is supplied with air or a gas having a larger vol-% of oxygen than air.

The chemical degradation conducted in this second stage is the so-called nitrification of the wastewater, and is conducted in most cases after the major portion of biological degradation has occurred in the first stage. Heretofore an intermediate clarification tank was provided between the first and second stages. This intermediate clarification, however, has proven to be uneconomical. Nonetheless, although expensive, the intermediate clarification was required because if omitted, it was difficult to maintain the very slowly growing nitrifying bacteria at the level necessary to conduct nitrification. More specifically, since both biological degradation and nitrification occur simultaneously, sludge is produced and the nitrifying bacteria would in the absence of an intermediate clarification be discharged as excess sludge, together with the very rapidly growing organic compound-degrading bacteria. As a result of this constant removal of nitrifying bacteria, the ammonium nitrogen present can no longer be reduced to the required values. The intermediate clarification, therefore, was considered necessary so as to enable nitrification to be conducted both in the presence of nitrifying bacteria and in the substantial absence of organic compounds and their associated bacteria.

SUMMARY OF THE INVENTION

It is an object of the present invention to provide a process of the type discussed hereinabove, as well as an apparatus for conducting the process, so that the quality of the purified wastewater can be improved, both with respect to BOD and COD, in a simple and economical fashion, while achieving a high degree of nitrification.

Upon further study of the specification and appended claims, further objects and advantages of this invention will become apparent to those skilled in the art.

These objects are attained in accordance with the invention by a process comprising the biological purification of wastewater in at least two immediately successive gas treatment stages wherein the wastewater is at least in part gas-treated in the presence of activated sludge to conduct biological degradation of organic substrate, resultant waste-water activated sludge mixture being withdrawn from the treatment zones and divided, in a post clarification stage, into purified water and said activated sludge, and the latter activated sludge being at least partially recycled into the treatment zones, and comprising conducting nitrification in at least one of said at least two immediately successive treatment stages in the presence of a macroporous carrier material for carrying nitrifying bacteria thereon. By "immediate successive gas treatment stages" is meant that the prior art intermediate clarifying stage is omitted.

According to a preferred embodiment of the invention, the $BOD_5$ is degraded in a steplike arrangement in the initial treatment stages for removing the organic pollutants, and the resultant wastewater-activated sludge mixture, carrying only a low level of organic pollutants, i.e. a $BOD_5$ of 10-30 mg/l, is introduced directly into the nitrification reactor which is enriched with nitrifying agents, i.e., nitrifying bacteria. In the nitrification reactor, the nitrogen compounds, still present, are oxidized into nitrate in accordance with conventional chemical reactions. The bacterial concentration required for this purpose is achieved with the aid of a carrier material offering a large active surface for the settling of the nitrifying bacteria thereon. Typical bacterial concentration achieved on the carrier material is 10-30 g/l carrier material. More specifically, the material should have large macropores so that the bacteria settles on the surface of the material in uniform distribution. The macropores of the carrier material forces the nitrifying bacteria to grow in a decentralized fashion whereby a substantially larger mass transfer area is obtained than in the case wherein the bacteria are carried on conventional flocculant activated sludge. Since the nitrifying bacteria are securely attached within the macropores of the carrier material, and the latter can be readily retained in the gas-treatment nitrification reactor, there is no danger that the nitrifying bacteria will be carried into the post clarification stage with the effluent, and into the drainage canal, or discharged from the system together with the excess sludge.

It is advantageous to treat the wastewater in an activated sludge treatment stage or stages arranged as aerated reactors upstream of the nitrification reactor. Preferably the upstream reactor or reactors for conducting biological degradation are fed with pure oxygen, or a gas containing a larger proportion of oxygen by volume than air. As a result, only air need be introduced in the nitrification reactor since the greater portion of organic pollutants have already been removed. Typical $BOD_5$ load of the feed into the nitrification reactor is 10–30 mg/l. By this arrangement a maximum degradation of the organic substances, i.e., removal of the organic carbon compounds, is attained in the initial activated sludge treatment stages. Thus, the largest oxygen demand occurs, in the process for the treatment of wastewaters with the use of activated sludge, at those locations where the wastewater and the microorganisms are first mixed, with the microorganisms at this time being in their maximum growth phase. Therefore, in the present invention the oxygen-rich gas is utilized only in the initial treatment stage or stages, and the residual oxygen demand for nitrification is satisfied merely by aeration with air in a nitrification reactor. Introduction of air into the nitrification stage is necessary so that dissolved carbon dioxide, produced in the initial activated sludge treatment stages during BOD reduction, is stripped out from the wastewater/activated sludge mixture as a result of the larger gas throughput required when the gas introduced is air. Thus, inhibition of the growth of nitrifying bacteria by carbon dioxide present is prevented. In accordance with this mode of operation, costs are reduced with respect to the gas supply for the gas treatment process, as well as reducing the actual cost of construction of the device required for carrying out the process of the invention.

The macroporous material employed preferably has macropores of a size from 0.1 to 5 mm, more preferably 0.5 to 2 mm, as well as a low specific gravity preferably 20 to 200, more preferably 50 to 100 kg/m$^3$. This material is employed as the carrier material for nitrifying bacteria. The low specific gravity prevents the carrier material from sinking immediately to the bottom of the reactor making up the nitrification stage, and enhances intermixing of the nitrifying bacteria with the wastewater to be treated. Materials which give especially good properties are activated carbon and/or polyurethane foam of a density of about 20–200 kg/m$^3$, more preferably, 50 to 100 kg/m$^3$, which can be easily maintained floating on the surface. Other materials which function effectively are polystyrol, polyethylene, polypropylene, urea formaldehyde resin. In this context, it is advantageous to employ a carrier material for nitrifying bacteria having a particle diameter of about 2–50 mm, more preferably 10 mm.

According to one embodiment of the process of this invention, the carrier material for the nitrifying bacteria is separated from the wastewater-activated sludge mixture discharged from the nitrification zone and thus retained in the nitrification stage. As a result of the particle size employed in the invention, the carrier material can be easily retained in the nitrification reactor by means of a separator such as a screen. Thus, it is ensured that a sufficient bacterial concentration is available at all times for nitrification in the nitrification stage without incurring appreciable losses. Minimum concentration of nitrifying bacteria is 4 g/l carrier material. In a further development of the process of the invention, provision is made for conducting the wastewater-activated sludge mixture effluent from the nitrification stage, in part to the post clarification stage, and in part recycled to the activated sludge treatment stage disposed upstream, and/or to a treatment stage downstream of the nitrification stage, for denitrifying treatment. If denitrification is not conducted in the treatment stage upstream of the nitrification stage, then essentially only settled activated sludge recycled from the post clarification stage is mixed with newly entering wastewater and subjected to gas treatment, i.e., with a high proportion of $O_2$. However, if denitrification is to be conducted in the initial treatment reactor upstream of the nitrification reactor, then the denitrification is carried out under anoxic conditions so that, in such a case, the effluent wastewater-activated sludge mixture from the nitrification reactor is directly recycled and fed together with the newly entering untreated wastewater, not treated with an oxygen-containing gas, or only treated to a minor extent, e.g., at a concentration of oxygen in liquid of 0.5 mg/l. The entering untreated wastewater in this instance is utilized, as a result of its organic substrate, primarily as an electron donor particularly the carbon compounds, which donor is required for the reduction of the nitrate and nitrites contained in the recycled activated sludge to nitrogen. Following the denitrification, the wastewater-activated sludge mixture treated in this manner is conducted to another treatment zone, and the thus-liberated nitrogen, not yet escaped from the anoxic treatment zone, is discharged.

The apparatus for conducting the process of the invention comprises at least two treatment stages through which the wastewater is successively passed, and a post clarification tank disposed downstream from the last treatment stage and connected thereto by discharge means. The post clarification tank includes a sludge recycle conduit to the treatment stages. The apparatus is characterized in that one of the treatment stages, e.g., the last one, is designed as a nitrification stage, and is charged with a macroporous carrier material for carrying nitrifying bacteria. This arrangement offers the advantage that it is possible, in a single stage of the plant, to degrade the $BOD_5$ and then to effect nitrification. In accordance with this arrangement it is possible to construct the activated sludge aeration reactor, i.e., the high oxygen content introduction zone, of a smaller size than conventional reactors, as well as to eliminate the intermediate clarification tank, which also results in cost reductions.

In still another embodiment of the apparatus of the invention, provision is made to equip the treatment stage or stages located upstream of the nitrification stage with gas feed means, associated with gas distributing means for pure oxygen, and/or a gas containing more oxygen than air, and to arrange an air feed means and distributing means in the nitrification stage.

It is also advantageous to associate the discharge means, i.e., the drain of the nitrification stage with separating means for retaining carrier material in the nitrification reactor.

In accordance with another embodiment, the first treatment stage is designed at least in part as a denitrification zone and is connected, by means of a connecting conduit, to the discharge means of the nitrification stage for having mixed wastewater and sludge discharged from the nitrification stage recycled thereto. By providing means for controlling the feed means for the gas utilized in this treatment stage, it is thus possible to conduct in the first treatment zone, as required, either a denitification under anoxic conditions, i.e., without a gas supply, or the normal $BOD_5$ degradation with gas supply, i.e., oxygen feed.

BRIEF DESCRIPTION OF THE DRAWING

Various other objects, features and attendant advantages of the present invention will be more fully appreciated as the same becomes better understood when considered in conjunction with the accompanying drawings, and wherein:

The sole FIGURE schematically illustrates the preferred embodiment of the arrangement for carrying out the process of the invention.

DETAILED DISCUSSION OF THE INVENTION

In the FIGURE, a wastewater treatment plant is shown having four treatment stages 1, 2, 3 and 4 and a post clarification tank 6 disposed downstream and connected to the last treatment stage 4 by means of a discharge means 5, i.e., a discharge line. This post clarification tank 6 is in communication by means of a sludge recycle conduit 7, through a pump 8 associated therewith, with the first treatment stage 1. The process of this invention, however, can be performed, depending upon requirements, with at least two or alternatively, an arbitrary number of treatment stages. In this embodiment, it is preferred that the first three treatment stages 1, 2 and 3 be covered with respect to the atmosphere. Introduction of oxygen is conducted by, for example, withdrawing through a conduit, not numbered, gas from the gas atmosphere produced underneath the covers of the treatment zones 1, 2, 3, and composed of the oxygen-enriched gas fed thereinto through the gas feed means 1b, 2b and 3b and of the gas rising from the liquid mixture, and by conducting such gas to gas distributing means 1a, 2a and 3a located in close proximity to the tank bottom. In such a case, it is preferred mixing devices are arranged above the gas distributors 1a, 2a and 3a to ensure thorough intermixing of wastewater-activated sludge and oxygen, although this is not necessary depending on the type of distributor, i.e., gas spargers employed. The nitrification treatment stage 4 includes air introducing means 4a thus, all the treatment stages 1, 2, 3 and 4 operate as gas treatment stages with stages 1, 2 and 3 for biological oxidation, and stage 4 primarily for nitrification. Wastewater passes into the first gas treatment stage through feed means 9 and is therein mixed with recycle sludge from conduit 7, and with oxygen introduced therein. The wastewater is then conducted into the subsequent gas treatment stage 2 wherein it is treated in the same way, and then finally introduced into the gas treatment stage 3 where it is likewise mixed, in the aforementioned way, with oxygen and activated sludge.

While the wastewater is in the gas treatment stages 1, 2 and 3, the microorganisms present in the activated sludge substantially decompose or degrade the organic carbon compounds so that the wastewater exiting from the gas treatment stage 3 carries only a weak load. This wastewater is then conducted into the gas treatment stage 4 for nitrification.

The parameters for the different streams are summarized on the following table, both as to general and preferred ranges:

|  | General | Preferred |
|---|---|---|
| BOD load of feed into Stage 1 | 100–500 mg/l | 150–300 mg/l |
| BOD load of feed into Stage 2 | 50–200 mg/l | 75–150 mg/l |
| BOD load of feed into Stage 3 | 30–100 mg/l | 40–75 mg/l |
| BOD load of feed into Stage 4 | 10–30 mg/l | 10–25 mg/l |
| Gas flow rate and % $O_2$ into Stage 1 | 100–500 ml $O_2/m^3$ wastewater, 99% $O_2$ | 150–300 ml $O_2/m^3$ wastewater |
| Gas flow rate into Stage 4 | 2–5 $m^3$ air/$m^3$ wastewater | 2–3 $m^3$ air/$m^3$ wastewater |
| Rate of wastewater flow into Stage 1 | 0.2–0.5 $m^3$ wastewater/$m^3$ reactor h | 0.25–0.3 $m^3$ wastewater/$m^3$ reactor h |
| Rate of wastewater flow into Stage 2 | 0.2–0.5 $m^3$ wastewater/$m^3$ reactor h | 0.25–0.3 $m^3$ wastewater/$m^3$ reactor h |
| Rate of wastewater flow into Stage 3 | 0.2–0.5 $m^3$ wastewater/$m^3$ reactor h | 0.25–0.3 $m^3$ wastewater/$m^3$ reactor h |
| Rate of wastewater flow into Stage 4 | 0.3–0.6 $m^3$ wastewater/$m^3$ reactor h | 0.4–0.5 $m^3$ wastewater/$m^3$ reactor h |
| Rate of recycle flow without denitrification | 20–100% | 30–70% |
| Rate of recycle flow with denitrification | 100–300% | 100–200% |
| BOD load at discharge of Stage 4 | 5–20 mg/l | 7–15 mg/l |

According to this invention, the gas treatment stage 4 is charged with a macroporous, lightweight carrier material 10, for example activated carbon or polyurethane foam. Nitrifying bacteria are cultivated on the carrier material and effect, under air supply in the gas treatment zone 4, oxidation of the ammonium nitrogen still present in the wastewater to nitrite or nitrate, respectively. In addition, any residual organic substances are completely degraded.

It is preferred that particles having a diameter of 2–50 mm, most preferably 10 mm, be utilized as the carrier material. The particles can be readily retained by means of a separator 11, for example, a screen, arranged at the outlet 5 from the gas treatment stage 4. This ensures that no nitrifying bacteria are discharged into the post clarification tank. Thus, there is no danger that any substantial amounts of nitrifying bacteria will be discharged with the excess sludge, or drift off into the drainage canal.

The purified wastewater finally passes through the discharge means into the post clarification tank 6 from which the purified water is removed through a conduit 12. The settled sludge is withdrawn from the post clarification tank 6 through a conduit 7 and, in part, recycled by means of a pump 8 into the first gas treatment zone 1, with the other part discharged as excess sludge through conduit 13. The excess sludge can also be withdrawn through conduit 14 from the biological degradation stages 1-3 upstream of the nitrification stage 4 to relieve the post clarification stage 6.

In a special embodiment wherein denitrification of the wastewater is to be carried out, a conduit 15 is provided, through which part of the wastewater discharged from the gas treatment stage 4 is returned into the gas treatment stage 1 even before reaching the post clarification tank 6. Typically, when this is done, the returned portion will be 100-200% of the total wastewater flow from stage 4.

Since the denitrification must be conducted under anoxic conditions, conventional type devices are used for interrupting or reducing the oxygen feed into the gas treatment stage 1 so that the stage 1 operates as a denitrification stage. Thus, the wastewater from conduit 15 to be denitrified, activated sludge from conduit 7, and fresh wastewater from feed means 9 is introduced to provide sufficient organic substrate which for the nitrite-nitrate reduction is necessary as an electron donor. In this embodiment, the carbon compounds contained in the fresh wastewater cause the nitrite or nitrate present in the recycled wastewater to be reduced to nitrogen. The so-evolved nitrogen can then be exhausted through a conduit 16 from the denitrification stage.

The thus-denitrified wastewater then passes into the gas treatment stage 2, wherein it is mixed with oxygen, and then into the gas treatment stage 3. In the last-mentioned gas treatment stages, the $BOD_5$ degradation then is again conducted and the process is conducted as hereinbefore described.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the biological purification of wastewater in at least two immediately successive gas treatment stages which comprises: gasifying the wastewater in the presence of activated sludge to conduct biological degradation of organic substrate, withdrawing resultant wastewater activated sludge mixture from the treatment stages and dividing said mixture in a post-clarification stage, into purified water and said activated sludge, and partially recycling the activated sludge into the treatment stages, and further comprising conducting primarily nitrification in the last of said at least two immediately successive treatment stages in the presence of a macroporous carrier material consisting essentially of open-cell polyurethane foam particles having a particle size diameter of 2-50 mm, a specific gravity of 20-200 kg/m³ and open pore size of 0.1-5 mm, with the macroporous carrier material carrying nitrifying bacteria thereon with the bacteria in a concentration on the carrier material of 10-30 g/l, and with primarily organic carbon compound degradation having been conducted in the at least one upstream stage of said at least two immediately successive treatment stages with a feed stream of gas containing a greater proportion of oxygen than air and conducting the organic carbon compound degradation in the at least one upstream stage to an extent such that the $BOD_5$ of the wastewater being passed to the last treatment stage to conduct nitrification therein is at a level of organic pollutants of 10-30 mg/l, treating the wastewater in the nitrification stage with a feed stream of air, and separating the carrier material for nitrifying bacteria from the wastewater-activated sludge mixture exiting from the nitrification stage, and retaining said carrier material in the nitrification stage whereby loss of nitrifying bacteria is avoided by retaining said nitrifying bacteria on said particles.

2. A process according to claim 1, wherein said gas fed to the upstream treatment stage is substantially pure oxygen.

3. A process according to claim 1, wherein the organic degradation in the stage upstream of the nitrification stage is conducted in a stage covered with respect to atmosphere.

4. A process according to claim 1 further comprising conducting only a part of the wastewater-activated sludge mixture discharged from the nitrification stage to the post clarification stage, and conducting the other part into a denitrification treatment stage arranged at least one of connected upstream or downstream of the nitrification stage.

5. A process according to claim 1, wherein said covered stage is a three section stage, and wherein the organic carbon compound degradation is conducted such that, when a $BOD_5$ load of 150-300 mg/l is fed to the three section stage, the discharge from the first section has a $BOD_5$ load of 50-200 mg/l, the discharge from the second section has a $BOD_5$ load of 40-75 mg/l, and the discharge from the third section to the last treatment stage has a $BOD_5$ load of 10-25 mg/l.

6. A process according to claim 1, wherein the particle size is 10 mm, the density is 50-100 kg/m³ and the open pore size is 0.5-2 mm.

7. In an apparatus for conducting an activated sludge biological degradation and nitrification process, comprising at least two treatment stages (1, 2, 3, 4) arranged for being traversed in immediate succession by wastewater, and a post clarification means connected by discharge means downstream from the last treatment stage, said post clarification means having a sludge recycle conduit to the treatment stages, and one of said treatment stages (1, 2, 3, 4) being a nitrification stage (4) charged with a macroporous carrier material consisting essentially of open-cell polyurethane foam particles having a density of 20-200 kg/m³, an open pore size of 0.1-5 mm and a particle size diameter of 2-50 mm, and said apparatus further comprising a separator (11) associated with a discharge means (5) of the nitrification stage (4) for retaining and preventing carrier material (10) in the nitrification stage (4) from being discharged therefrom, when in use in treating wastewater, first feed means operatively associated with the treatment stages (1, 2, 3,) located upstream from said nitrification stage (4) for introducing substantially pure oxygen or a gas containing a higher proportion of oxygen than air thereinto, and second feed means operatively associated with said nitrification stage (4) for introducing air thereinto.

8. An apparatus according to claim 7, wherein said first feed means comprises distributing means for distributing the gas feed into the wastewater in said upstream treatment stages (1, 2, 3).

9. An apparatus according to claim 7, wherein the first treatment stage (1) of said at least two treatment stages is adapted for conducting, at least in part, a denitrification therein, said first stage being connected, by means of a connecting conduit (15), to said discharge means (5) of said nitrification stage (4).

10. An apparatus according to claim 7, wherein said treatment stages (1, 2, 3) upstream of the nitrification stage (4) are covered with respect to atmosphere.

11. An apparatus according to claim 7, wherein the density is 50–100 kg/m$^3$, the particle size is 10 mm, and the open pore size is 0.5–2 mm.

* * * * *